United States Patent [19]

Hempelmann et al.

[11] Patent Number: 4,900,096

[45] Date of Patent: Feb. 13, 1990

[54] WHEEL TRIM

[75] Inventors: Heinrich J. Hempelmann, Livonia; Thomas J. Mack, Union Lake, both of Mich.

[73] Assignee: NI Industries, Inc., Novi, Mich.

[21] Appl. No.: 272,815

[22] Filed: Nov. 18, 1988

Related U.S. Application Data

[63] Continuation-in-part of Ser. No. 145,513, Jan. 19, 1988.

[51] Int. Cl.⁴ .............................................. B60B 7/04
[52] U.S. Cl. .............................. 301/37 SS; 301/37 SC
[58] Field of Search ................ 301/37 R, 37 S, 37 SS, 301/37 SC, 37 P, 37 CM

[56] References Cited

U.S. PATENT DOCUMENTS 4,452,493 6/1984 Liggett ............................ 301/37 SS

FOREIGN PATENT DOCUMENTS 2169250 7/1986 United Kingdom ............ 301/37 SS

Primary Examiner—Russell D. Stormer
Attorney, Agent, or Firm—Harness, Dickey & Pierce

[57] ABSTRACT

A wheel trim assembly including a plurality of radial extending spoke members is characterized by a spoke retention plate integrally formed from a polymeric material for gripping the inward radial ends of a first and second plurality of spoke members, respectively, on a first and second axial layer in a secure manner so as to inhibit annoying noise-generating vibration as well as to securely retain the center hub assembly, spokes and outer ring in assembled relationship. The center retention contemplates a separate lock collar being insertably, nonrotatably captivated within a central plate opening and the integral arrangement for inhibiting rotation of the lock nut rotatably disposed therewithin.

21 Claims, 7 Drawing Sheets

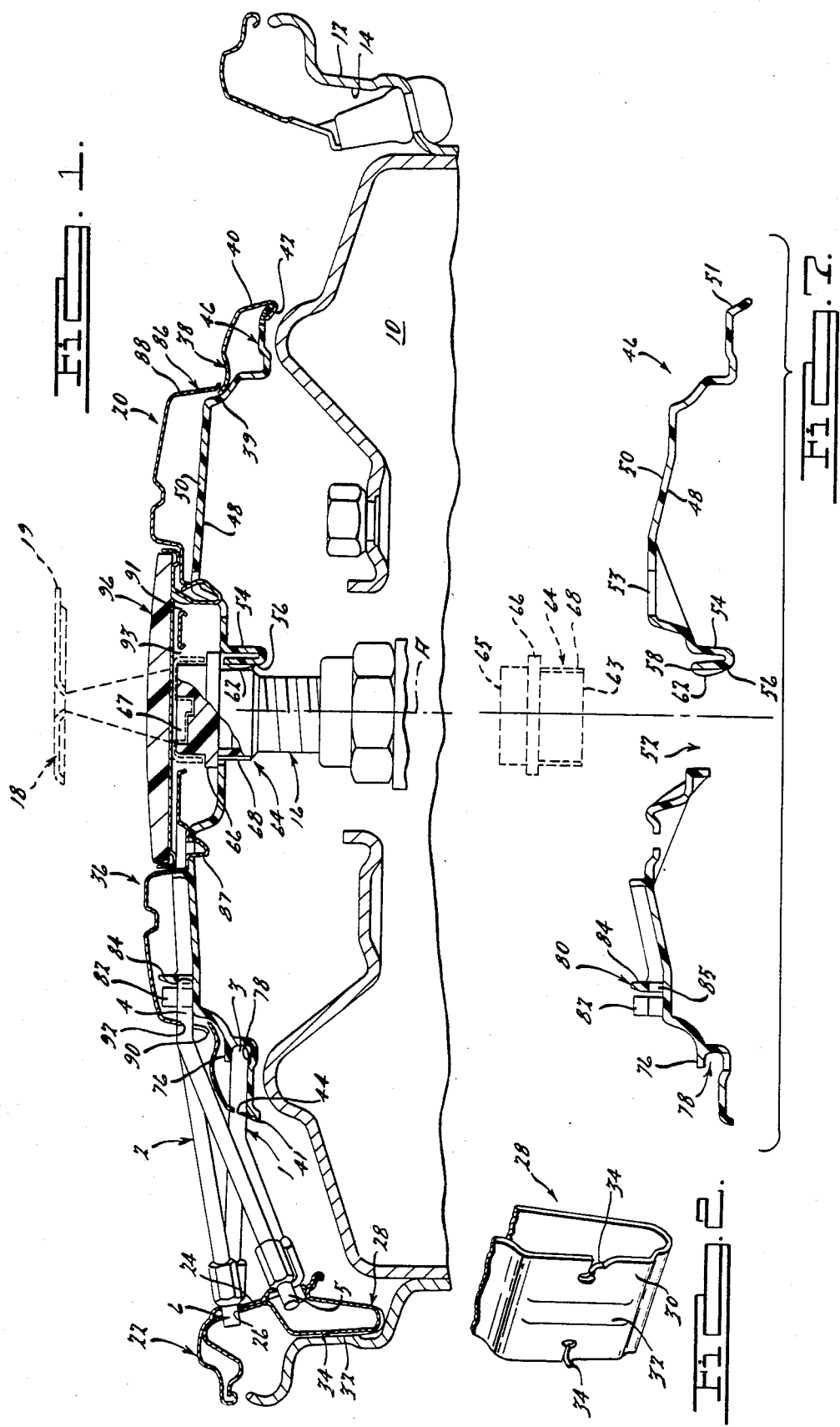

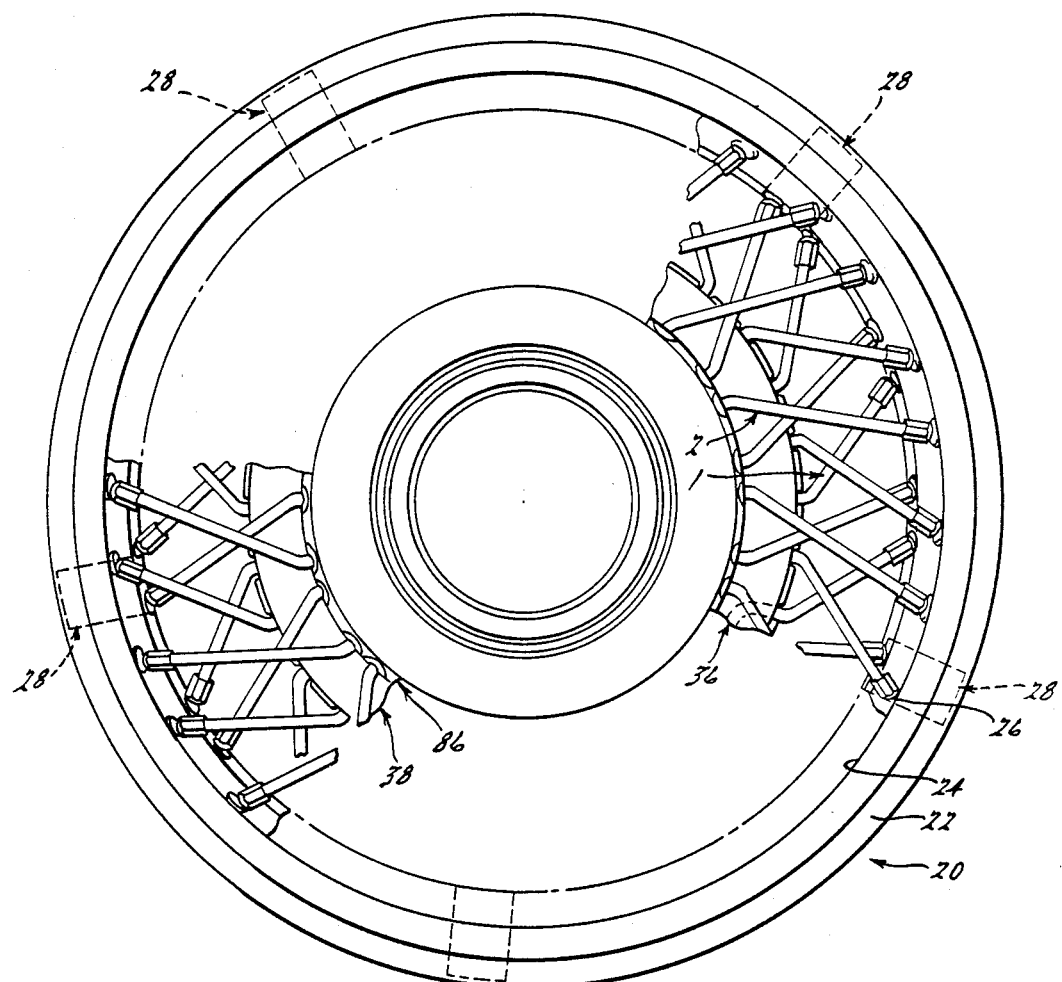
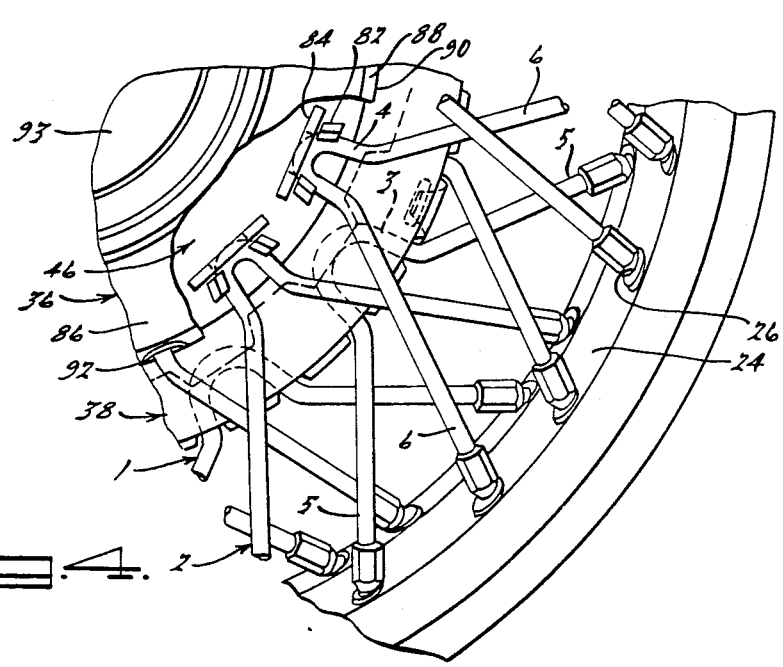

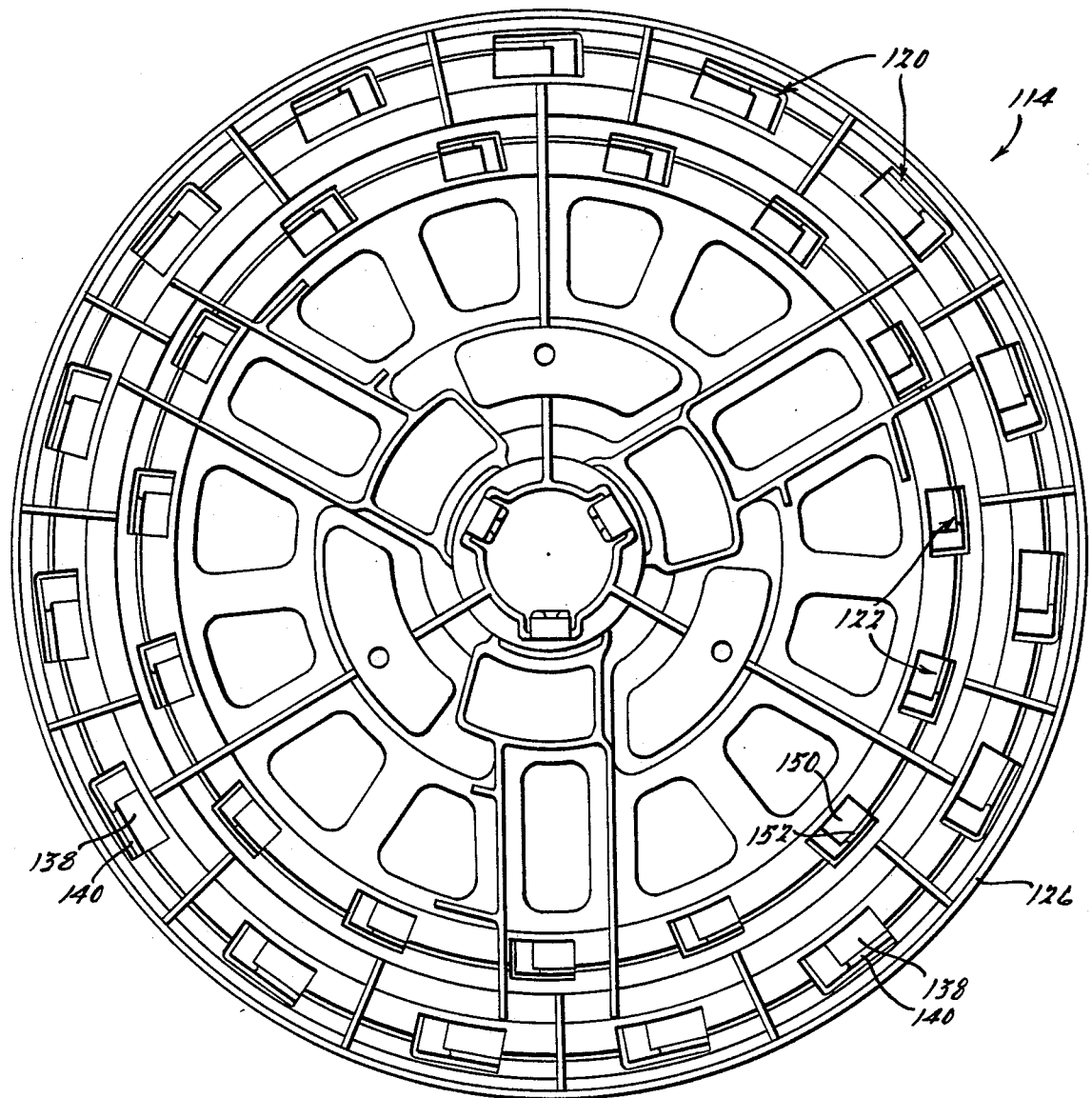
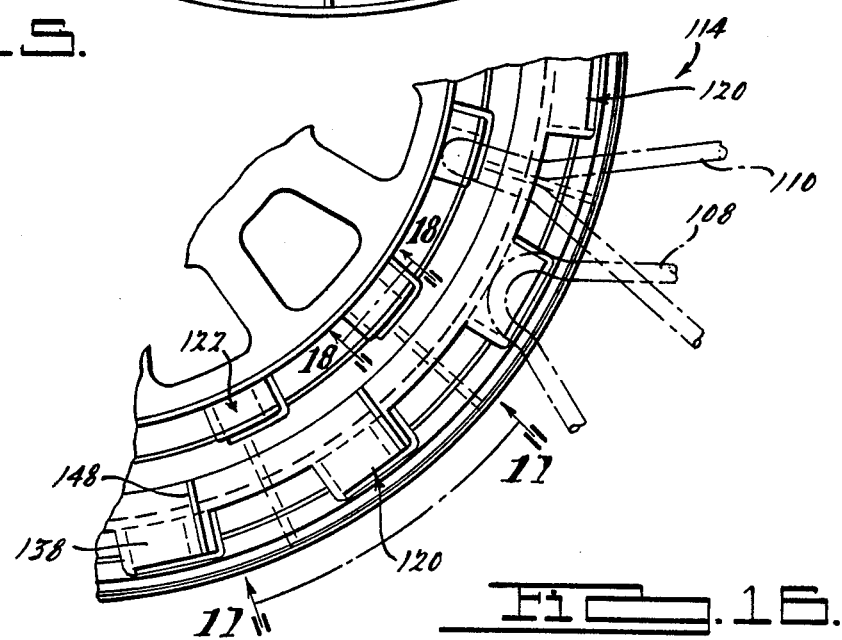

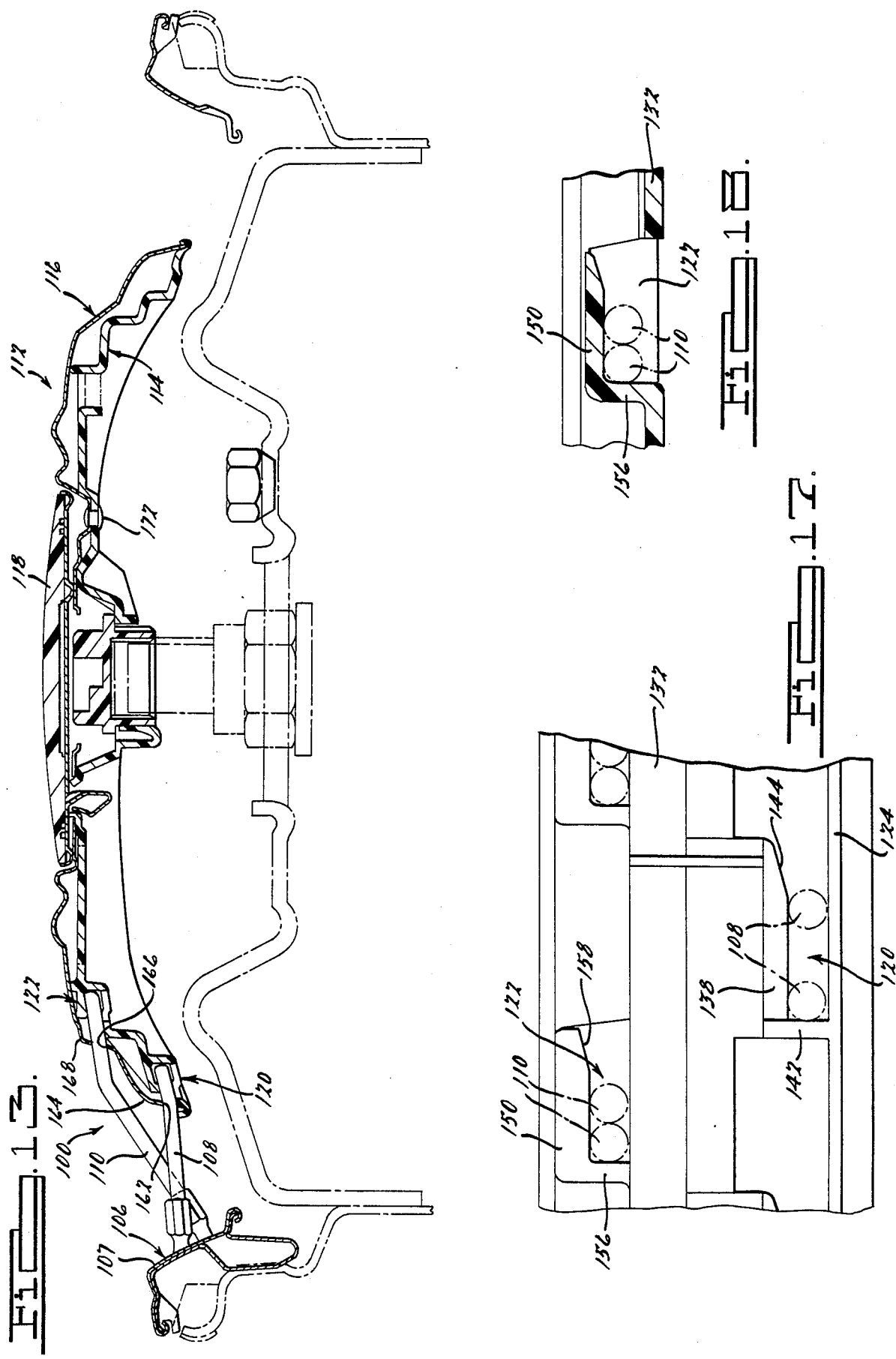

WHEEL TRIM

CROSS-REFERENCE TO RELATED APPLICATION

This application is a continuation-in-part of copending application Ser. No. 145,513 entitled "Wheel Trim" filed Jan. 19, 1988.

BACKGROUND AND SUMMARY OF THE INVENTION

This invention relates generally to wheel trim and more specifically to an improved simulated wire wheel trim as well as to an improved technique for assembling such simulated wire wheel trim.

Wheel trim have long been employed to ornamate the axially outwardly facing appearance of the motor vehicle. While such wheel trim impart an attractive appearance to the vehicle and particularly its wheels, the weight thereof increases the unsprung weight of the vehicle and hence if excessive may result in degradation of the vehicle's ride characteristics. Additionally, since fuel economy of a vehicle is directly related to the gross weight of the vehicle, auto manufacturers are constantly under pressure to reduce the weight of components used in vehicles. Accordingly, it would be desirable to reduce the weight of the vehicle wheel trim. While exterior surfaces of the trim made for appearance and/or ornamentation purposes in some applications still rely on metal, other components could be fabricated from lighter weight materials.

In addition to minimizing the weight of such wheel trim, it is important that the components thereof be securely fastened together so as to avoid annoying noise generation. Additionally, it is important to minimize the costs thereof in terms of both labor and materials required to manufacture such wheel trim.

The present invention overcomes these often conflicting objectives by providing a simulated wire wheel trim which utilizes an integrally fabricated retainer plate comprised of a polymeric composition which incorporates a central anti-rotation and retention arrangement therewith.

The spoke retainer plate of the present invention is designed to be easily and inexpensively fabricated as a one piece structure thereby reducing the number of components required to be assembled while still providing a secure and durable means for retaining the spokes in assembled relationship. Additionally, because the spoke retainer plate is fabricated from a polymeric composition, it is both lighter in weight and better able to dampen any noise generating vibration. Further, because the retainer plate is fully capable of retaining the spoke members in assembled relationship, the decorative outer cover may be fabricated from relatively light gauge metal thereby further reducing the overall weight of the wheel trim as well as material costs associated therewith.

Addtional advantages and features of the present invention will become apparent from the subsequent description and the appended claims taken in conjunction with the accompanying drawings.

BRIEF DESCRIPTION OF THE DRAWINGS

FIG. 1 is an enlarged cross-section view in elevation of a simulated wire wheel trim assembly shown installed to a vehicle wheel;

FIG. 2 is an enlarged view of a spring clip for resisting rotation of the wheel trim assembly circumference relative to the vehicle wheel;

FIG. 3 is a fragmentary plan view of a portion of the simulated wire wheel trim assembly as seen looking in an axially inwardly direction;

FIG. 4 is a fragmentary plan view of the wheel trim shown in FIG. 3 with portions broken away to show a center retainer plate comprised of a plastic material and in accordance with the present invention;

FIG. 7 is a section view taken along line 7—7 of FIG. 5 showing the plastic retainer plate and a lock collar integrally formed in the central portion thereof;

FIG. 13 is a section view of the embodiment shown in FIG. 12, the section being taken along a radial plane extending along the axis of rotation of the vehicle wheel;

FIG. 15 is a back view of the spoke retainer plate forming a part of the embodiment shown in FIG. 12;

FIG. 16 is a fragmentary plan view of the retainer plate of FIG. 15;

FIG. 17 is a fragmentary view of a portion of the retainer plate illustrated in FIG. 16 as seen looking from line 17—17 thereof; and FIG. 18 is a section view ff the spoke retainer plate shown in FIG. 16, the section being taken along line 18—18 thereof.

DESCRIPTION OF THE PREFERRED EMBODIMENTS

Figure 5:
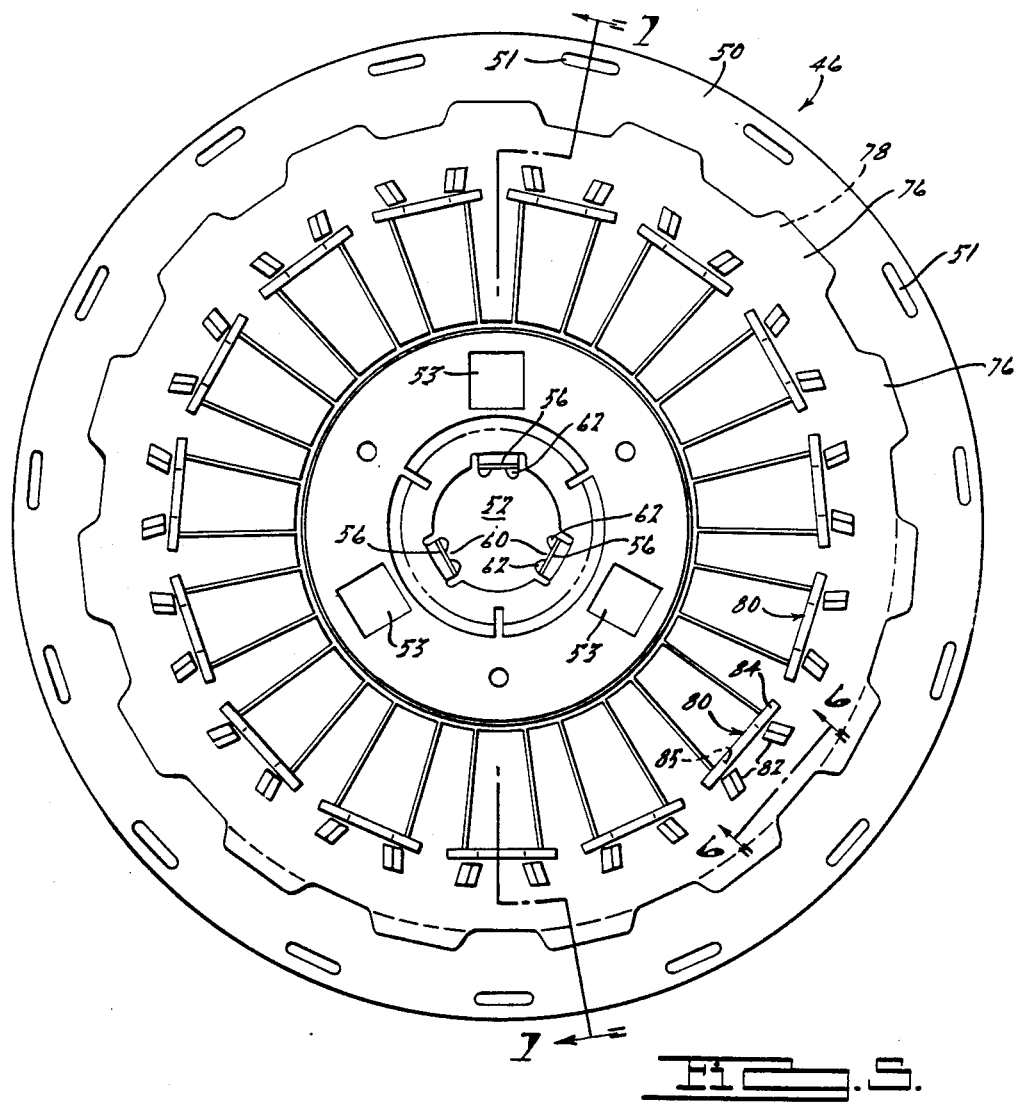
FIG. 5 is a plan view of the retainer plate.
Figure 6:
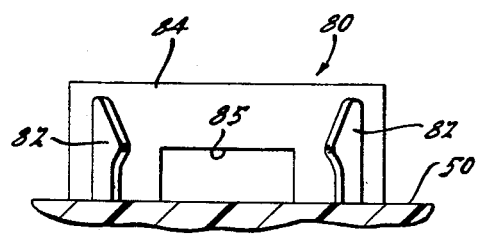
FIG. 6 is an elevation view taken along line 6—6 of the retainer plate shown in FIG. 5.
Figure 8:
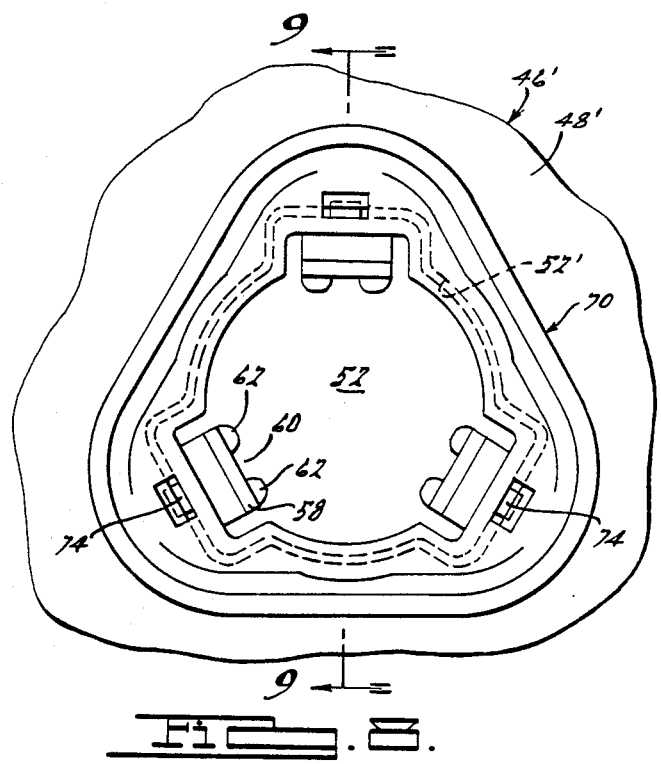
FIG. 8 is a plan view of a plate member receiving in an aperture thereof a separate lock collar.
Figure 9:
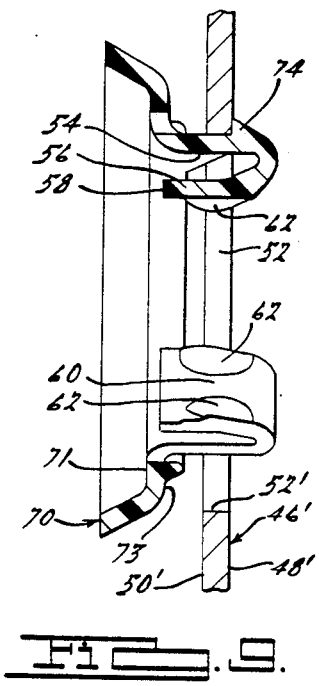
FIG. 9 is a section taken along line 9—9 of FIG. 8 showing the lock collar disposed in the plate member.
Figure 10:
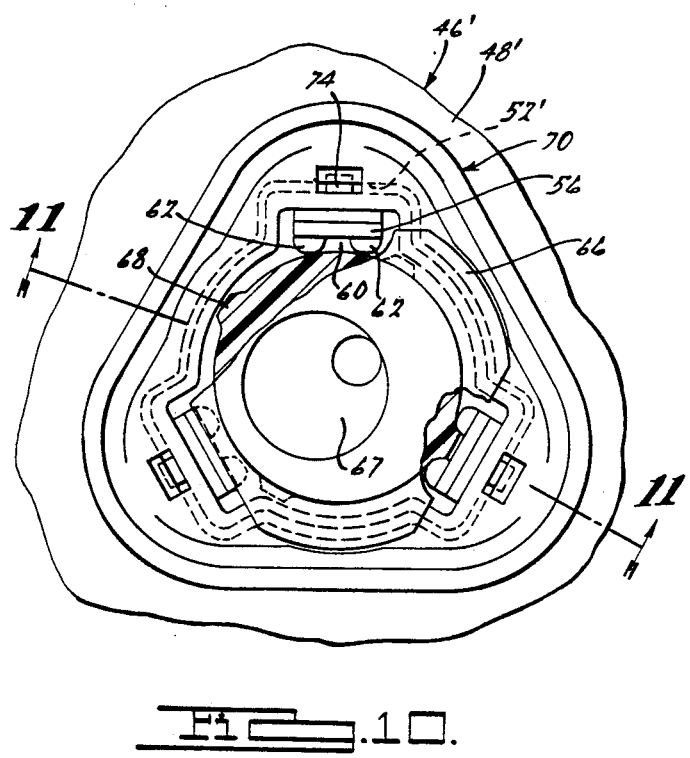
FIG. 10 is a plan view similar to FIG. 8 showing a lock nut disposed within the lock collar.
Figure 11:
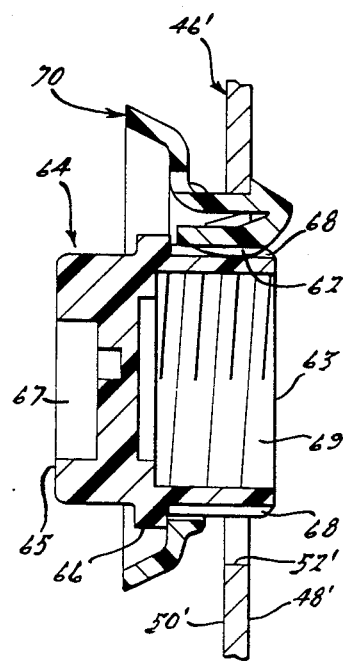
FIG. 11 is a cross-section view taken along line 11—11 of FIG. 10.
Figure 12:
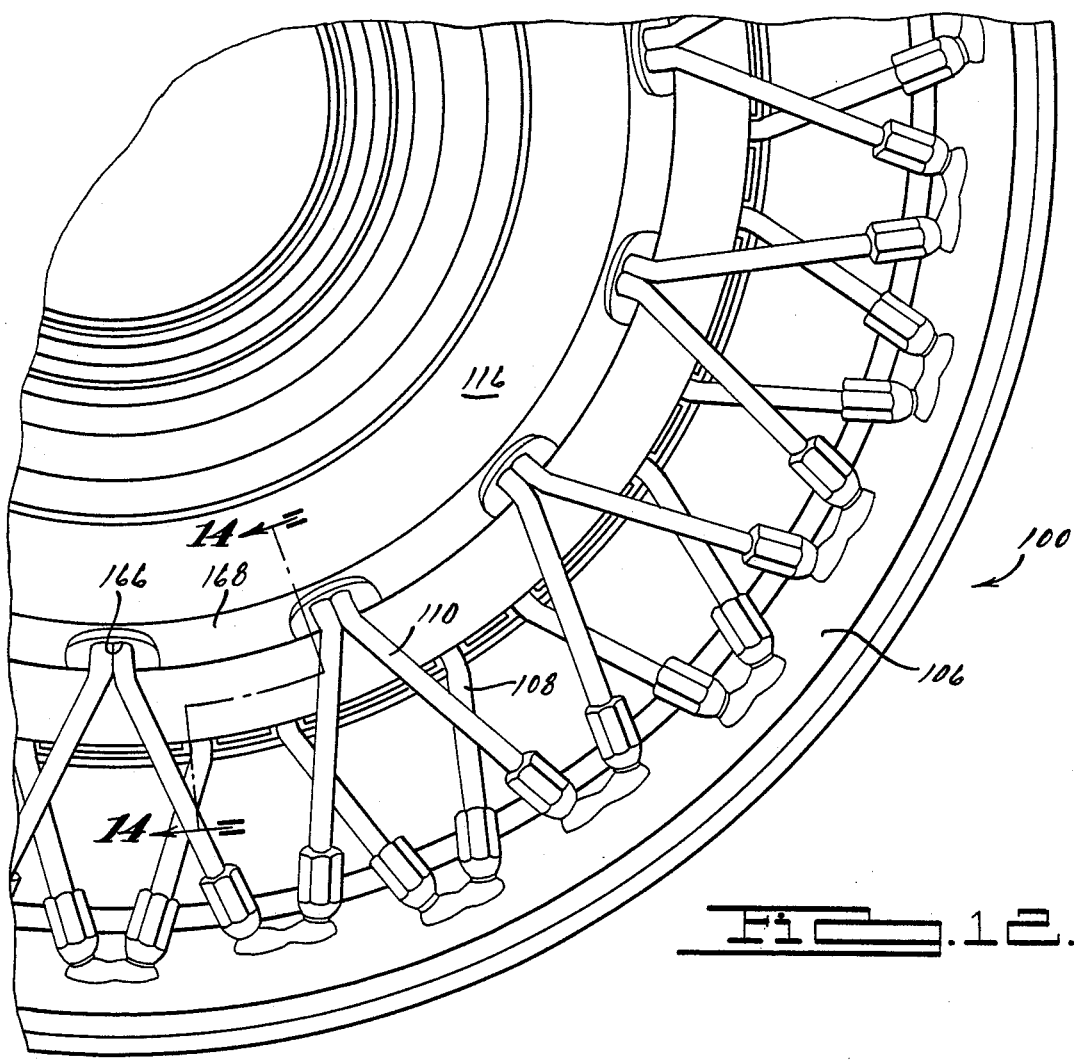
FIG. 12 is a fragmentary plan view of a portion of another embodiment of a simulated wire wheel trim in accordance with the present invention.

Referring now to the drawings, there is illustrated a simulated wheel trim assembly indicated generally at 20 which is designed to be secured to a vehicle wheel 10 by means of a center anti-theft retention system. As used herein, the terms "axially" and "radially" are with respect to the axis "A" (see FIG. 1) of the vehicle axle having mounted thereon the wheel 10 to which the wheel trim assembly of this invention is attached. Vehicle wheel 10 includes an irregularly shaped radial shoulder 12 having radially inwardly facing surface 14, and an axially outwardly extending externally threaded shaft or spindle 16. A tool 18 (shown in phantom) is used to secure the assembly to the wheel.

Simulated wheel trim 20 comprises an outer annular ring assembly 22, an inner center hub assembly 36 interconnected by a plurality of generally radially extending spoke members 1, 2 arranged to define axially inner and outer layers at their radially inner ends 3, 4 and including radially outer ends 5, 6, a center lock nut 64 adapted to be secured to an axially outwardly facing spindle of the vehicle wheel and journalled for rotation within the inner center hub assembly and anti-rotation means for inhibiting relative rotation of the wheel trim with respect to the vehicle wheel. Each spoke member is gull-shaped such that each includes a pair of outer ends and a single nose-shaped inner end.

Outer annular ring assembly 22 includes a frusto-conical side wall 24 facing radially inwardly and including angularly spaced openings 26 for receiving the radially outer ends 5, 6 of the inner and outer layers of spoke members 1, 2. A plurality of substantially identical irregularly shaped centering clips 28 extend around the side wall each centering clip aiding in centering and in resisting rotation of the wheel trim circumference with respect to the vehicle wheel. The clip 28 is generally U-shaped to define an axially extending flange 30 with axial ribs 32 thereof being adapted to frictionally engage radial shoulder 12 of the vehicle wheel. Further, opposite edges of the flange are lanced to define a sharp protusion 34 adapted to bite into the radial shoulder whereby to inhibit rotation of the wheel trim relative thereto.

Center hub assembly 36 comprises axially outer and inner spoke retainer plates 38, 46 which are designed to be secured together and cooperate to secure the radially inner ends 3 of the axially inner layer of spoke members 1. An axially outer retainer member 86 is also provided which is positioned in overlying relationship to the axially outer spoke retainer plate 46 and is secured thereto by spring clips 87 and cooperates therewith to clamp the radially inner ends 4 of the axially outer layer of spoke members 2.

The axially outer spoke retainer plate 38 is generally circular in shape and has a generally frusto-conically extending radially outwardly facing side wall 40, a radially outer edge 41 thereof being provided with tab portions 42 which are bent axially inwardly and upwardly and about the inner spoke retainer plate 46 and a radially inner edge 39 superposed by the axially outer retainer member 86. The side wall 40 is provided with an annular array of openings 44 in circumferentially spaced relationship therearound each sized so as to loosely accommodate a respective radially inner end 3 of the axially inner layer of spoke members 1.

Axially inner spoke retainer plate 46 is of generally circular configuration and includes an axially inner surface 48, an axially outer surface 50 and a relatively large diameter central opening 52 extending between its surfaces and through which the lock nut 64 is designed to pass. In accordance with this invention, retainer plate 46 is integrally molded of a suitable polymer such as ABS plastic, and more particularly Nypel 2360. In this construction, a center retention arrangement for resisting rotation of the lock nut is conveniently disposed axially inwardly of the plate thereby enhancing axial compactness of the wheel trim and a spoke retention structure is provided for ease of captivating receipt of the axially inner and outer ends 3, 4 from the respective layers of spoke members 1, 2. Retainer plate 46 includes around its circumference a plurality of spaced slots 51 each adapted to cooperate with the tab portions 42 to clamp the spoke retainer plates together. Further, three off-center openings 53 cooperate with spring clips 87 from the axially outer retainer member 86 to clamp the respective plates together.

With respect to the center retention arrangement for resisting trim rotation, three equiangularly spaced, axially extending, integrally formed generally rigid support beams 54 are adjacent the central opening 52 each beam extending perpendicularly from the axially inner surface 48 and each being U-shaped in cross-section so as to include a laterally deflectable spring beam 56 the free end 58 thereof being radially deflectable. The free end portion of each spring beam includes a detent 60 between a pair of generally axially extending angularly spaced ribs 62. Each rib 62 has a pair of angularly disposed faces that are acutely angled relative to a radius from the axis "A" so as to define leading and trailing cam faces.

The lock nut 64 is generally cylindrical and includes axial front and rear faces 63, 65, an annular shoulder 66 medially of the faces, a shaped combination recess 67 extending axially inwardly from the rear face, a threaded recess 69 extending axially inwardly from the front face for connecting engagement to the shaft 16, and a plurality of radially outwardly extending ribs 68 each extending axially between the annular shoulder and the front face. Each rib 68 has a pair of angularly disposed faces that are acutely angled relative to a radius from the axis "A" so as to define leading and trailing cam faces. The lock nut is designed to fit snugly into the opening 52 of axially inner spoke retainer plate 46 and be journalled for rotation therewithin.

The outside diameter of the lock nut is slightly greater than the diameter defined by inward radial extension of the ribs 62 on the spring beams when the beams are in their undeflected state. The ribs 68 on the nut extend radially outward and periodically engage the ribs 62 on the spring beam 56 whereby the ribs cooperate to inhibit rotation. The ribs 68 on the nut are adapted to fit interiorly of the detent 60 and so dimensioned as to not engage or radially deflect the spring beam and thus do not place a preload on the plastic spring beam. This is an important consideration in that under severe change of temperature if the ribs on the lock nut were to leave the spring beam deflected and overstressed, cracking of the beam could result. The shape of the ribs on the spring beam and/or lock nut are such that if the lock nut rib engages the peak of a spring beam rib, the lock nut rib will be cammed so as to fall either within the detent and not stress the spring beam or fall to the other side of the spring beam rib. The ribs 62, 68 could have their leading cam faces less acutely angled than their trailing cam faces whereby to permit assembly rotation more easily than disassembly rotation. When the lock nut has been threadedly advanced onto the shaft, reverse rotation is inhibited by the ribs 68 on the lock nut advancing against the ribs 62 on the spring beam.

Preferably, and in accordance with this invention, three equiangularly disposed spring beams 56 with their associated ribs 62 are provided to resist rotation of four equiangularly disposed ribs 68 on the lock nut 64. An unsymmetrical configuration or arrangement wherein there are a greater number of ribs 68 than spring beams assures that the ribs 68 will have their greatest effect in inhibiting rotation. Assembly and removal of the lock nut is shown in FIG. 1 by the tool 18 having a specially configured end to engage with the combination recess therewithin.

While an integral rotation resisting center retention is shown, it is to be understood that a separately provided lock collar 70 could be nonrotatably snap fit into an opening 52' of an inner spoke retaining plate 46' and that this lock collar would receive the lock nut 64. As shown in FIGS. 8–11, the lock collar has a shaped shoulder including an axially inner surface 73 adapted to engage axially outer surface 50' of the plate, an axially outer surface 71 adapted to be engaged by the shoulder 66 of the lock nut, opening 52 extending between the surfaces 71, 73 and the support beam 54 including a retention lance 74 to abut the axially inner surface 48' and prevent the lock collar from coming out of the opening 52'. The support beam 54 allows axial reciprocation of the lock collar within opening 52' with axially inner surface 73 limiting inward axial movement of the lock collar. In all other respects, the spring beams 56 and opening 52 cooperate to receive and inhibit rotation of the lock nut as hereinabove described. Advantageously such a lock collar could be used in retrofitting as desired into other wheel trim assemblies.

With respect to the retention structure for the spoke members 1, 2, the axially inner spoke retainer plate 46 has on a radially outward skirt portion of its axially outer surface 50 a plurality of equiangularly spaced radially extending tab portions 76 that define radial recesses 78 for captivating the U-shaped noses 3 of the axially inner layers of spoke members 3. Further, a plurality of equiangularly spaced spoke retention cages 80 are provided for captivating the U-shaped noses 4 of the axially outer layer of spoke members 2. The spoke retention cages include a pair of upstanding first walls 82 each disposed at an acute angle to a radius drawn from center axis of the plate and a radially deflectable second wall 84 generally perpendicular to the radius and disposed between the first walls, each of the walls 82, 84 being generally perpendicular to axially outer surface 50. A rectangularly shaped slot 85 in second wall 84 is adapted to receive the inward radial nose 4 of the axially outer layer of spoke members 2.

Outer retainer member 86 is generally cup-shaped and includes a frusto-conical wall 8 including a plurality of circumferentially spaced radial slots 92 each disposed axially outwardly from an axially inner and radially outer peripheral edge 90 thereof and through which the radially inner ends 4 of the axially outer layer of spoke members 2 are designed to project, three radially inward spring clips 87 to be received in openings 51 of retention plate 46 and an axially outer and radially inner peripheral edge 94 defining a central opening 93 and including spaced openings 91.

A medallion 96 having spring clips 98 extending axially inward therefrom are adapted to be releasably captivated in the openings 91 such that the medallion will cover and limit access to the lock nut 64. One end 19 of the tool 18 is used to pry the medallion off of the wheel cover.

In practice the following steps are used to assemble a wheel trim according to the present invention. Position radially outer ends 5 of the axially inner layer of spokes 1 into some of the spoke mounting openings 26 of the outer annular ring assembly 22. Position the integrally formed plastic inner spoke retainer plate 46 on the center axis of the annular ring 22 such that the spoke retainer recesses 78 are positioned relative to radial inward ends 3 of the spokes 1. The radial inward ends 3 of the inner layer of spokes 1 are positioned on the axially outer surface 50 of plastic retainer plate 46 whereupon the plate is lifted axially upward and rotated whereby to drive each radially inward end 3 of the spokes 1 into clamping relationship between a respective recess 78 formed by the pieces of plastic 76, 50. Place the axially outer spoke retainer plate 38 thereover such that the radially inner ends 3 of the spokes 1 are within the openings 44. The three spring tabs 42 are deformably bent around into slots 51 and secured to the axially outer spoke retention member.

The radially outer ends 6 of the axially outer spokes 2 are loaded into the other openings 26 of the outer annular ring assembly 22 and the radially inner ends 4 are pushed axially inward (i.e., downwardly) between the first walls 82 which function to guide the nose of ends 4 against the second wall 84 which radially deflects and allows the nose ends 4 to be snapped in and captivated in the opening 85 thereof. Position the axially outer retainer member 86 such that the slots 92 are passed over radially inner ends 4 of the spokes 2 and its central spring beam 87 snapped into the off-center openings 53.

Referring now to FIGS. 12 through 18, there is illustrated another embodiment of the present invention indicated generally at 100. Wheel trim 100 is similar to wheel trim 20 and includes an outer annular ring 106 having a generally radially inwardly facing flange portion 107 provided with a plurality of axially and circumferentially spaced openings which are adapted to receive the radially outer ends of an axially inner circumferential array of spokes 108 and an axially outer circumferential array of spokes 110. A center hub assembly 112 is provided which is supported by spokes 108, 110 and includes a spoke retainer plate 114 which serves to retain the radially inner ends of respective axially inner and outer spokes 108, 110 in assembled relationship and a one piece decorative outer sheet metal cover member 116. As shown, wheel trim 100 is designed to employ a center lock anti-theft retention system similar to that described above with respect to wheel trim 10 and hence a center cover member 118 is also provided being removably secured to center hub assembly 112.

Spoke retainer plate 114 is generally circular in shape and is fabricated as a one piece structure from a suitable polymeric composition such as a mineral filed nylon material for example. A first plurality of substantially identical circumferentially spaced pockets 120 are provided adjacent the outer periphery of spoke retainer plate 114 and a second plurality of substantially identical circumferentially spaced pockets 122 are provided being positioned radially inwardly of and circumferentially between pockets 120.

Figure 14:
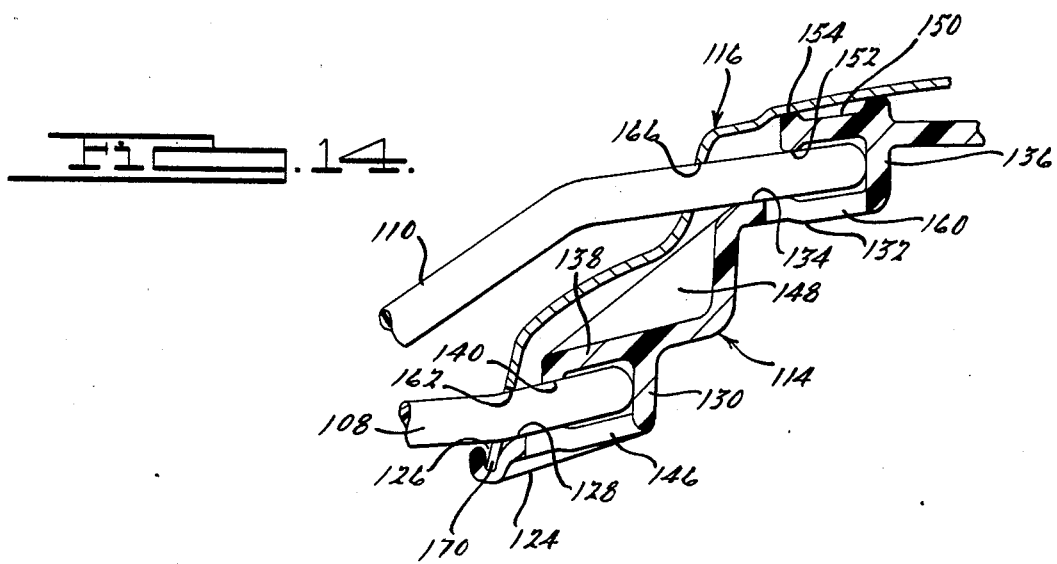
FIG. 14 is an enlarged fragmentary section view of the wheel trim shown in FIG. 12, the section being taken along line 14—14 thereof.

As best seen with reference to FIGS. 14 and 17, retainer plate 114 includes a generally radially extending axially inner annular flange portion 124 having an axially outwardly opening generally U-shaped annular channel 126 at the radially outer end thereof and an axially outwardly raised radially extending generally planar surface 128 disposed immediately radially inwardly adjacent channel 126. An annular flange portion 130 extends generally axially outwardly from the radial inner edge of flange 128. Similarly disposed radially and axially outwardly of flange 124, a second generally radially extending axially outer annular flange portion 132 is provided having a similar axially outwardly raised radially extending generally planar surface portion 134. Also, another annular flange portion 136 extends generally axially outwardly from the radial inner edge of flange portion 132.

Each of pockets 120 is defined by an axially outer wall or flange portion 138 positioned in generally parallel axially outwardly spaced relationship to flange portion 124 and extending generally radially outwardly from axially extending flange portion 130 a distance less than that of flange portion 124. The radially outer end of flange 138 is of slightly increased thickness so as to define an axially inwardly projecting generally planar surface portion 140. An end wall 142 extends axially inwardly from flange portion 138 at one circumferential end thereof and interconnects it with flange portion 124 so as to close off one circumferential side of pocket 120. The other side of pocket 120 opens circumferentially outwardly and the axially inner surface of flange portion 138 is provided with an axially outwardly tapered or beveled portion 144 thereat. As shown, flange portion 124 is provided with an opening 146 disposed axially inwardly of flange portion 138 and of a size slightly larger than that of flange portion 138 which serves to greatly simplify the tooling required for forming retainer plate 114. As thus described, each of the substantially identical pockets 120 is open on the radially outer and axially inner sides as well as at one circumferential end thereof, the remaining surfaces being defined by end wall 142, flange portion 138 and end wall 130. In order to enhance the rigidity of flange portion opposite the end closed by end wall 142, a reinforcing gusset type flange portion 148 is provided extending in a generally radial direction.

Each of the substantially identical pockets 122 is similarly defined by an axially outer wall or flange portion 150 positioned in generally parallel axially outwardly spaced relationship to flange portion 132 and extending generally radially outwardly from axially extending flange portion 136 a distance less than that of flange portion 132. The radially outer end of flange 150 is of slightly increased thickness so as to define an axially inwardly projecting rib 152 and a generally axially outwardly projecting rib 154. An end wall 156 extends axially inwardly from flange portion 150 at one circumferential end thereof and interconnects it with flange portion 132 so as to close off one circumferential side of pocket 122. The other side of pocket 122 opens circumferentially outwardly and the axially inner surface of flange portion 150 is provided with an axially outwardly tapered beveled portion 158 thereat. As shown, flange portion 132 is provided with an opening 160 disposed axially inwardly of flange portion 150 and of a size slightly larger than that of flange portion 150 which serves to greatly simplify the tooling required for forming retainer plate 114. As thus described, each of the substantially identical pockets 122 is open on the radially outer and axially inner sides as well as at one circumferential end thereof, the remaining surfaces being defined by end wall 156, flange portion 150 and end wall 136.

Outer cover member 116 is generally circular in shape having an irregular cross-sectional contour shaped to present an aesthetically pleasing appearance. Preferably, cover member 116 will be fabricated from a relatively light gauge sheet metal such as by stamping and the axially outer surface thereof will be finished in a suitable manner to present a pleasing aesthetic appearance. A first plurality of circumferentially spaced axially inwardly opening slots 162 are provided around an axially inwardly projecting radially outwardly disposed flange portion 164 of outer cover member 116 through which spoke members 108 extend and a second plurality of circumferentially spaced openings 166 are provided in a radially outwardly facing axially outwardly spaced flange portion 168 through which spoke members 110 extend.

In order to assemble wheel trim 100, the axially outer ends of the axially inner spoke members 108 are first inserted in the appropriate openings provided in annular ring 106. Thereafter outer cover member 116 is placed in position such that the radially inner ends of spoke members 108 extend through the respective slots 162 provided around the peripheral edge 170 thereof. Next, the radially inner ends of the axially outer spoke members 110 are inserted through the respective openings 166 provided in outer cover member 116 after which the radially outer ends thereof are inserted into the appropriate openings in outer ring 106. The thus partially completed assembly is then turned over and retaining plate 114 positioned such that the radially inner ends of spokes 108 and 110 are positioned against respective flanges 124 and 132 in the space between respective pockets 120 and 122. Additionally, as thus positioned, peripheral edge 170 of outer cover member 116 will be positioned within channel 126 of retainer plate 114. Thereafter retainer plate 114 will be rotated relative to outer cover member 116 in a direction so as to move the radially inner ends of spoke members 108 and 110 across inclined surfaces 142, 158 of flanges 138, 150 respectively and into the pockets 120, 122 until the respective spoke members engage end walls 142 and 156. Thereafter, a plurality of rivets 172 are installed in circumferentially spaced relationship to secure outer cover member 116 and retainer plate 114 in assembled non-rotatable relationship thus completing the assembly operation.

It should be noted that the spacing between surfaces 128, 140 and between surface 134 and protrusion 152 will preferably be slightly less than the diameter of the respective spoke members 108, 110 received therebetween such that these surfaces will cooperate to exert a secure gripping force thereon. Gusset flange 148 will operate to resist axial outward deflection of flange 138 while protrusion 154 bearing against the outer cover member 116 will aid in resisting deflection of flange 150 to thereby insure this secure gripping relationship is maintained. Additionally, the circumferential length of the respective pockets will be sufficient to insure that each leg of the respective spoke members will be fully received within the pocket to insure the gripping relationship will be established therewith. End walls 130 and 136 also act to provide abutment surfaces to prevent radial inward movement of the respective spoke members thus insuring the radial outer ends thereof are retained within the openings in ring 106.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A simulated wire wheel trim for a motor vehicle wheel comprising:
   an outer ring member having a plurality of axially and radially spaced apertures,
   a center hub assembly;
   a plurality of spoke members extending generally radially between and interconnecting said outer ring and said center hub assembly,
   said center hub assembly including
     a one piece decorative outer cover member having a plurality of circumferentially spaced openings, said plurality of spoke members extending through respective ones of said openings;
     a spoke retainer member including means defining a plurality of circumferentially spaced pockets for receiving the radial inner ends of said plurality of spokes, each of said pockets being operative to restrict movement of said spoke members so as to aid in retaining said plurality of spoke members, said center hub assembly and said outer ring in assembled relationship; and means securing said spoke retainer and said outer cover member together.

2. A simulated wire wheel trim as set forth in claim 1 wherein each of said pockets restricts movement of said spoke members in axial and radially inward directions.

3. A simulated wire wheel trim as set forth in claim 2 wherein each of said pockets includes first and second flange portions overlying axial inner and outer surfaces of said spoke members respectively.

4. A simulated wire wheel trim as set forth in claim 3 wherein one of the circumferential ends of said pockets is open, said spoke members being moved into said pockets through said open circumferential end.

5. A simulated wire wheel trim as set forth in claim 4 wherein one of said flange portions includes a beveled surface portion adjacent said open end and operative to guide movement of said spoke member into said pocket.

6. A simulated wire wheel trim as set forth in claim 1 wherein said spoke retainer member includes means defining a peripheral channel, the radially outer edge of said outer cover member being received within said channel.

7. A simulated wire wheel trim as set forth in claim 1 wherein said spoke retainer member includes portions engaging the axially inner surface of said outer cover member and operative to resist axial inward deflection of said outer cover member.

8. A simulated wire wheel trim for a motor vehicle wheel comprising:
    an outer ring member having a plurality of axially and radially spaced apertures,
    a center hub assembly;
    a plurality of spoke members extending generally radially between and interconnecting said outer ring and said center hub assembly,
    said center hub assembly including
        a one piece decorative outer cover member having a plurality of circumferentially spaced openings, said plurality of spoke members extending through respective ones of said openings;
        a one piece spoke retainer member including a plurality of circumferentially spaced pockets for receiving the radial inner ends of said plurality of spokes, each of said pockets being operative to restrict movement of said spoke members in axial and radial inward directions so as to aid in retaining said plurality of spoke members, said center hub assembly and said outer ring in assembled relationship, each of said pockets includes first and second flange portions overlying axial inner and outer surfaces of said spoke members respectively; said flange portions being axially spaced a distance less than the axial thickness of said spoke members prior to receiving said spoke members; and
    means securing said spoke retainer and said outer cover member together.

9. A simulated wire wheel trim as set forth in claim 8 wherein one of said first and second flange portions extends continuously around said retainer member.

10. A simulated wire wheel trim as set forth in claim 9 wherein the other of said first and second flange portions defining each of said pockets are circumferentially spaced around said retainer member.

11. A simulated wire wheel trim as set forth in claim 8 wherein each of said pockets includes an end wall, said end wall cooperating with the radially inner end of said spoke members to resist radial inward movement thereof.

12. A simulated wire wheel trim as set forth in claim 11 wherein said spoke retainer member is formed from a polymeric composition.

13. A simulated wire wheel trim for a motor vehicle wheel comprising:
    an outer ring member having a plurality of axially and radially spaced apertures,
    a center hub assembly;
    a first plurality of spoke members having radially outer ends thereof disposed in selected ones of said apertures and extending generally radially inwardly to said center hub assembly,
    a second plurality of spoke members having radially outer ends disposed in said apertures and radially inner ends received within said center hub assembly in axially spaced relationship to said first plurality of spoke members,
    said center hub assembly including
        a one piece decorative outer cover member having a first plurality of circumferentially spaced openings and a second plurality of circumferentially spaced openings axially spaced from said first plurality of openings, radially inner ends of said first plurality of spoke members extending through respective ones of said first plurality of openings and radially inner ends of said second plurality of spoke members extending through respective ones of said second plurality of openings;
        a one piece spoke retainer member including means defining first and second axially spaced annular arrays of circumferentially spaced pockets for receiving the radial inner ends of said first and second plurality of spokes, each of said pockets including means for restricting axial movement and radial inward movement of respective of said first and second plurality of spoke members so as to retain said first and second plurality of spoke members, said center hub assembly and said outer ring in assembled relationship; and
    means securing said spoke retainer and said outer cover member together.

14. A simulated wire wheel trim as set forth in claim 13 wherein each of said first and second annular arrays of pockets open radially outwardly and at one circumferential end thereof.

15. A simulated wire wheel trim as set forth in claim 14 wherein each of said axially outer walls is beveled at said open circumferential end thereof so as to guide movement of said spoke member into said pocket.

16. A simulated wire wheel trim for a motor vehicle wheel comprising:
    an outer ring member having a plurality of axially and radially spaced apertures,
    a center hub assembly;
    a first plurality of spoke members having radially outer ends thereof disposed in selected ones of said apertures and extending generally radially inwardly to said center hub assembly,
    a second plurality of spoke members having radially outer ends disposed in said apertures and radially inner ends received within said center hub assembly in axially spaced relationship to said first plurality of spoke members, said center hub assembly including a one piece decorative outer cover member having a first plurality of circumferentially spaced openings and a second plurality of circumferentially spaced openings axially spaced from said first plurality of openings, radially inner ends of said first plurality of spoke members extending through respective ones of said first plurality of openings and radially inner ends of said second plurality of spoke members extending through respective ones of said second plurality of openings;

a one piece spoke retainer member including first and second axially spaced annular arrays of circumferentially spaced pockets for receiving the radial inner ends of said first and second plurality of spokes, each of said pockets including a radially inner surface operative to inhibit radial inward movement of respective ones of said first and second plurality of spoke members and an axially outer wall, said axially outer wall of each said first annular array of pockets being axially spaced from a first annular flange portion provided on said retainer member and cooperating therewith to grasp the radially inner ends of said first plurality of spoke members therebetween and said axially outer wall of each of said second annular array of pockets being axially spaced from a second annular flange portion provided on said retainer member and cooperating therewith to grasp the radially inner ends of said second plurality of spoke members so as to retain said first and second plurality of spoke members, said center hub assembly and said outer ring in assembled relationship; and means securing said spoke retainer and said outer cover member together.

17. A simulated wire wheel trim as set forth in claim 16 wherein said first and second annular flange portions are circumferentially continuous.

18. A simulated wire wheel trim as set forth in claim 16 wherein said axially outer walls are circumferentially elongated and spaced around said retainer member.

19. A simulated wire wheel trim as set forth in claim 18 wherein said first and second flange portions each have a plurality of circumferentially spaced openings provided therein, each of said openings being substantially axially aligned with one of said axially outer walls.

20. A method of assembling a simulated wire wheel trim having an annular outer ring, a first plurality of spoke members, a second plurality of spoke members and a center hub assembly including a spoke retainer member and a decorative center hub member, said method comprising:

inserting the radially outer ends of said first plurality of spoke members into openings provided in said outer ring;

positioning said decorative center hub member centrally within said outer ring;

inserting the radially inner ends of said second plurality of spoke members through openings provided in said decorative center hub member;

inserting the radially outer ends of said second plurality of spoke members into openings provided in said annular ring;

positioning said spoke retainer member in axially aligned relationship with and on the axially inner side of said decorative center hub;

rotating said spoke retainer member with respect to said decorative center hub to move the radially inner ends of said first and second plurality of spoke members into respective pockets provided on said retainer member.

21. A simulated wire wheel trim as set forth in claim 20 further comprising fastening said decorative center hub and said spoke retainer together to prevent relative rotation therebetween.

* * * * *